Patented Nov. 4, 1941

2,261,735

UNITED STATES PATENT OFFICE 2,261,735

INSECTICIDE

Samuel I. Gertler and Herbert L. J. Haller, Washington, D. C., assignors to Henry A. Wallace, as Secretary of Agriculture of the United States of America, and his successors in office No Drawing. Application April 5, 1940,
Serial No. 328,094

7 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without the payment to us of any royalty thereon.

This invention relates to improvements in materials for destroying or checking the growth or multiplication of living organisms, whether plant or animal, which are economically injurious to man.

An object of the invention is to provide materials suitable for use as insecticides.

Another object of the invention is to provide a material for dusting or spraying delicate vegetation such as bean plants, peach trees, and plants grown under glass, which will not cause injury to foliage.

Another object of the invention is to provide a material which is relatively nontoxic to man and domestic animals when taken by mouth, and which can be used in place of lead arsenate and other arsenicals for destroying insects, without leaving harmful residues on fruits and vegetables.

We have found that substances belonging to a certain class of organic compounds have a specific toxic effect upon harmful insects, and our invention consists in the application of said substances to the destruction of insect pests.

The novel insecticides found by us belong to the class of organic compounds known as semicarbazones, and are formed by condensing aldehydes with semicarbazide. Suitable products according to this invention are semicarbazones having the formula

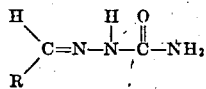

where R is an alkyl or an aryl group, either unsubstituted or substituted, the substituents being such as nitro, halogen, amino, hydroxy, etc., or where R is a heterocyclic nucleus.

The value of these compounds as insecticides is shown by the following examples:

1. Crotonaldehyde semicarbazone tested against newly hatched screwworm larvae by the "jar test" method was toxic at a concentration of 0.05%.

2. 2-furaldehyde semicarbazone tested against newly hatched screwworm larvae by the above method also was toxic at a concentration of 0.05%. This compound when used as a dust was also more toxic than derris to the melon worm, imported cabbage worm and the Hawaiian beet webworm larvae, after a 48-hour period.

3. Salicylaldehyde semicarbazone dusted on Swiss chard leaves when fed to the Hawaiian beet webworm of the fifth instar showed a higher mortality after 48 hours than derris.

It is to be understood that the above-mentioned compounds are used merely as examples and that this invention is not restricted by such use. Also the above examples are not to be construed as limiting either the method of application of these novel insecticides or the kinds of insects to which they may be applied.

Having thus described our invention, we claim:

1. An insecticide comprising a compound of the general formula

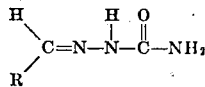

where R is an alkyl radical having substituents chosen from the group consisting of nitro, halogen, amino, and hydroxy.

2. An insecticide comprising a compound of the general formula

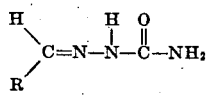

where R is an aryl radical having substituents chosen from the group consisting of nitro, halogen, amino, and hydroxy.

3. An insecticide comprising a compound of the general formula

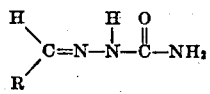

where R is a heterocyclic radical.

4. An insecticide comprising a compound of the general formula

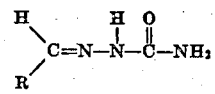

where R is a heterocyclic radical having substituents chosen from the group consisting of nitro, halogen, amino, and hydroxy.

5. An insecticide containing as its essential active ingredient crotonaldehyde semicarbazone.

6. An insecticide containing as its essential active ingredient 2-furaldehyde semicarbazone.

7. An insecticide containing as its essential active ingredient salicylaldehyde semicarbazone.

SAMUEL I. GERTLER.
HERBERT L. J. HALLER.